(12) United States Patent
Lodolo et al.

(10) Patent No.: US 7,558,898 B2
(45) Date of Patent: Jul. 7, 2009

(54) PORT REPLICATING APPARATUS

(75) Inventors: Luca Lodolo, Sunnyvale, CA (US); Jason Stone, South San Francisco, CA (US); Jonathan Stacey, Vancouver (CA); Christopher Allen Wilson, Fremont, CA (US); Benjamin Pei-Ming Chia, Cupertino, CA (US); Frederic Frappereau, Menlo Park, CA (US)

(73) Assignee: ACCO Brands Corporation, Lincolnshire, IL (US)

( * ) Notice: Subject to any disclaimer, the term of this patent is extended or adjusted under 35 U.S.C. 154(b) by 102 days.

(21) Appl. No.: 11/614,776

(22) Filed: Dec. 21, 2006

(65) Prior Publication Data

US 2008/0059681 A1    Mar. 6, 2008

Related U.S. Application Data

(60) Provisional application No. 60/824,039, filed on Aug. 30, 2006.

(51) Int. Cl.
*G06F 13/00* (2006.01)

(52) U.S. Cl. .................. 710/300; 710/303; 710/306

(58) Field of Classification Search ............... 710/300, 710/303, 304, 306, 311, 312, 315, 316
See application file for complete search history.

(56) References Cited

U.S. PATENT DOCUMENTS

| | | | |
|---|---|---|---|
| 5,436,792 A | 7/1995 | Leman et al. | |
| D368,704 S | 4/1996 | Tanaka | |
| 5,552,957 A | 9/1996 | Brown et al. | |
| 5,619,397 A | 4/1997 | Honda et al. | |
| 5,663,782 A | 9/1997 | Saita et al. | |
| 5,687,060 A | 11/1997 | Ruch et al. | |
| 5,751,548 A | 5/1998 | Hall et al. | |
| 5,768,101 A | 6/1998 | Cheng | |
| 5,774,332 A | 6/1998 | Ruch et al. | |
| 5,805,833 A * | 9/1998 | Verdun | 710/303 |
| 5,822,185 A | 10/1998 | Cavello | |
| 5,864,294 A | 1/1999 | Hsu et al. | |
| 6,091,602 A | 7/2000 | Helot | |
| 6,185,094 B1 | 2/2001 | Ruch et al. | |
| 6,185,096 B1 | 2/2001 | Helot et al. | |
| 6,188,572 B1 | 2/2001 | Liao et al. | |
| 6,208,508 B1 | 3/2001 | Ruch et al. | |
| 6,256,193 B1 | 7/2001 | Janik et al. | |
| 6,266,241 B1 | 7/2001 | Van Brocklin et al. | |
| 6,366,450 B1 | 4/2002 | Janicek | |
| 6,396,687 B1 | 5/2002 | Sun et al. | |

(Continued)

FOREIGN PATENT DOCUMENTS

WO    WO 03/103357 A1    12/2003

*Primary Examiner*—Khanh Dang
(74) *Attorney, Agent, or Firm*—Townsend and Townsend and Crew LLP

(57) ABSTRACT

A docking assembly including a port replicating apparatus is disclosed. The docking assembly includes a port replicating apparatus including (i) a housing having a major dimension defined by a first terminal end and a second terminal end, (ii) at least one interface for connecting to a portable electronic device, and (iii) a plurality of connectors in the housing for connecting to a plurality of peripheral devices. A base is also included in the docking assembly. It is capable of mechanically coupling to at least the first terminal end of the housing of the port replicating apparatus, such that the major dimension of the housing is vertically oriented.

11 Claims, 13 Drawing Sheets

U.S. PATENT DOCUMENTS

| | | |
|---|---|---|
| 6,424,524 B2 | 7/2002 | Bovio et al. |
| 6,490,154 B2 | 12/2002 | Thompson |
| 6,545,864 B2 | 4/2003 | Davis, IV |
| 6,560,094 B2 | 5/2003 | Schmidt |
| 6,583,984 B2 | 6/2003 | Yin et al. |
| 6,583,985 B2 | 6/2003 | Nguyen et al. |
| 6,608,749 B2 | 8/2003 | Hubbard |
| 6,643,127 B1 | 11/2003 | Richardson |
| 6,765,792 B2 | 7/2004 | Yin et al. |
| 6,819,548 B2 | 11/2004 | Hillis et al. |
| 6,833,989 B2 * | 12/2004 | Helot et al. ............. 361/686 |
| 6,990,549 B2 * | 1/2006 | Main et al. ............. 710/306 |
| 7,096,308 B2 * | 8/2006 | Main et al. ............. 710/315 |
| 2002/0048151 A1 | 4/2002 | Usui et al. |
| 2002/0085348 A1 | 7/2002 | Dai |
| 2002/0122291 A1 | 9/2002 | Hubbard |
| 2002/0135977 A1 | 9/2002 | Yin et al. |
| 2003/0235029 A1 | 12/2003 | Doherty et al. |
| 2004/0017652 A1 | 1/2004 | Billington et al. |
| 2004/0037032 A1 | 2/2004 | Hubbard |
| 2004/0057204 A1 | 3/2004 | Yin et al. |
| 2005/0136709 A1 | 6/2005 | Link |
| 2005/0162824 A1 | 7/2005 | Thompson |
| 2005/0168937 A1 * | 8/2005 | Yin et al. ............. 361/686 |
| 2005/0185364 A1 * | 8/2005 | Bell et al. ............. 361/679 |
| 2006/0020732 A1 * | 1/2006 | Charna ............. 710/303 |

\* cited by examiner

PORT REPLICATING APPARATUS

CROSS-REFERENCES TO RELATED APPLICATIONS

This application is a non-provisional of U.S. Patent Application No. 60/824,039, filed on Aug. 30, 2006, which is herein incorporated by reference in its entirety for all purposes.

BACKGROUND OF THE INVENTION

A number of port replicating apparatuses exist. A "port replicator" is a device containing common PC ports, such as serial and parallel ports. A cable can be used to mechanically and electrically couple a port replicator to a notebook computer. It allows one to easily attach a portable computer to standard, non-portable devices or peripheral devices such as printers and monitors. For example, if one uses a notebook computer both at home and at work, one could set up both work areas with corresponding port replicators. Desired peripheral devices such as printers and monitors may be connected to the port replicators. Then, one would just plug in the notebook computer into a port replicator at either location so that one is able to work with peripheral devices at either work or at home using the notebook computer. Most notebook computer manufacturers offer port replicators as an additional options.

A port replicator is similar to a "docking station". A docking station is another type of port replicating apparatus. Compared to a typical port replicator, a docking station provides additional slots or ports for adding expansion boards and storage devices, and typically provides power to a laptop computer.

Although existing port replicating apparatuses are satisfactory, a number of improvements could be made. For example, existing port replicating apparatuses are generally used in only one orientation (i.e., a horizontal orientation). It would be desirable to provide for a port replicating apparatus that can be used in different orientations so that it can be configured as desired by the end user.

Also, existing port replicating apparatuses could also be configured so that a host portable electronic device can optimally work with different peripheral devices. For example, different peripheral devices may require different data transfer speeds to operate in an optimal manner. It would be desirable to have a port replicating apparatus that uses a fast data transfer interface and can allow different peripheral devices to operate in an optimal manner.

Embodiments of the invention address these and other problems, individually and collectively.

BRIEF SUMMARY OF THE INVENTION

Embodiments of the invention are directed to docking assemblies, port replicating apparatuses, as well as systems and methods for using the docking assemblies and port replicating apparatuses.

One embodiment of the invention is directed to a docking assembly comprising a port replicating apparatus and a base. The port replicating apparatus comprises (i) a housing having a major dimension defined by a first terminal end and a second terminal end, (ii) at least one interface in the housing for connecting to a portable electronic device, and (iii) a plurality of connectors in the housing for connecting to a plurality of peripheral devices. The base is capable of mechanically coupling to at least the first terminal end of the housing of the port replicating apparatus, such that the major dimension of the housing is vertically oriented.

Another embodiment of the invention is directed to a port replicating apparatus. The port replicating apparatus comprises an interface, where the interface is adapted for use with a switching, serial bus architecture, and a plurality of connectors for connecting to a plurality of peripheral devices. The plurality of connectors include a first universal serial bus port electrically coupled to the interface via a universal serial bus hub, and a second universal serial bus port separately coupled to the interface without an intervening universal serial bus hub.

Another embodiment of the invention is directed to a port replicating apparatus comprising a housing having a major dimension defined by a first terminal end and a second terminal end. At least one interface is in the housing for connecting to a portable electronic device. A plurality of connectors are in the housing for connecting to a plurality of peripheral devices, where at least one of the peripheral devices comprises a display device. At least one input element is on the housing of the port replicating apparatus, wherein the at least one input element controls the operation of the display device.

Other embodiments of the invention are directed to systems and methods using the above-described port replicating apparatuses and docking assemblies.

BRIEF DESCRIPTION OF THE DRAWINGS

In the Figures, like numerals designate like elements, and the descriptions of like elements may not be repeated in some instances.

DETAILED DESCRIPTION

One embodiment of the invention is directed to a docking assembly. The docking assembly comprises a port replicating apparatus comprising (i) a housing having a major dimension defined by a first terminal end and a second terminal end, (ii) at least one interface in the housing for connecting to a portable electronic device, and (iii) a plurality of connectors in the housing for connecting to a plurality of peripheral devices. A base is also included in the docking assembly and it is capable of mechanically coupling to at least the first terminal end of the housing of the port replicating apparatus, such that the major dimension of the housing is vertically oriented. The housing may comprise any suitable combination of separable structures that may wholly or partially enclose electronic components in the port replicating apparatus.

As noted above, a "port replicating apparatus" may include docking stations, port replicators, and similar apparatuses that allow a host portable electronic device to detachably and operatively couple to a plurality of peripheral electronic devices. The port replicating apparatuses according to embodiments of the invention may expand the number of input/output (I/O) connectors for any suitable portable electronic devices and/or peripheral devices. Examples of host portable electronic devices include laptop computers, MP3 players, etc. Examples of peripheral devices that can supplement or interact with a host portable electronic device include mass storage devices such as hard disk drives, VGA monitors, LCD displays, computer mice, flash memory drives, etc.

Figures 1A, 1B:
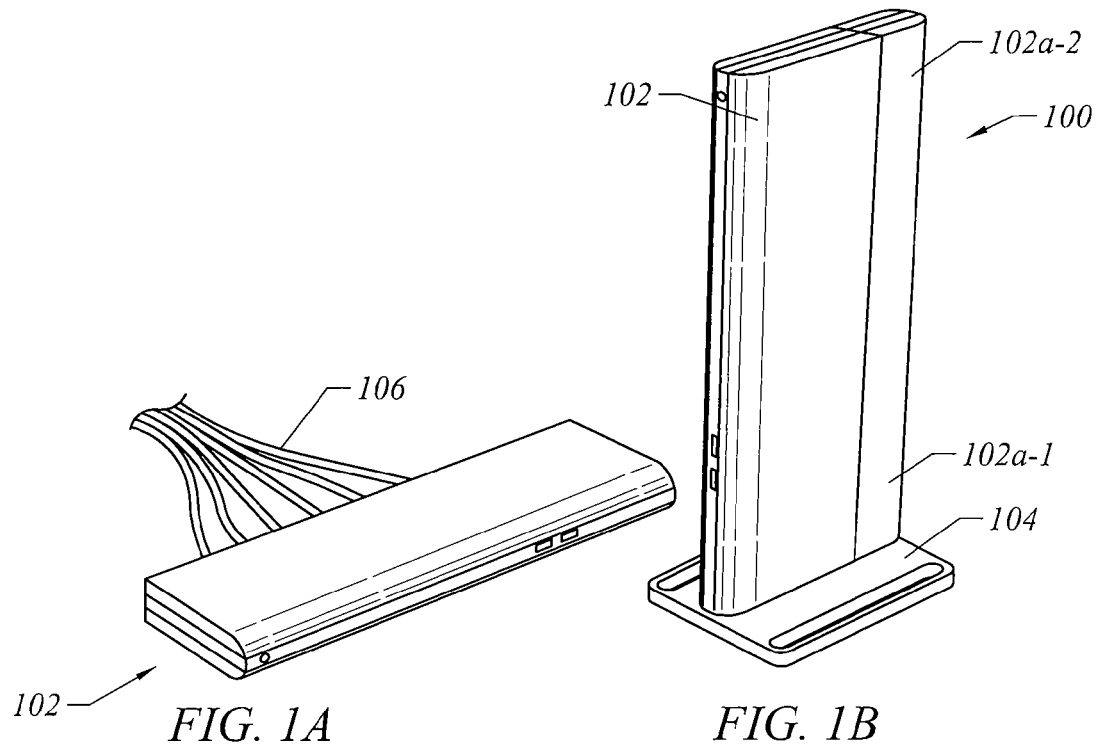
FIG. 1 shows a perspective view of a port replicating apparatus in a horizontal position.

FIG. 1(a) shows a perspective view of a port replicating apparatus 102 according an embodiment of the invention. The port replicating apparatus 102 is shown as being horizontally oriented and has a number of cables 106 extending from a rear portion of the port replicating apparatus 102.

FIG. 1(b) shows a docking assembly 100 including the port replicating apparatus 102 shown in FIG. 1(a). Compared to FIG. 1(a), the port replicating apparatus 102 in FIG. 1(b) is vertically oriented, and has a first terminal end 102(a)-1 proximate to and coupled to a base 104 and a second terminal end 102(a)-2 distal to and extending away from the base 104.

As shown, the port replicating apparatus 102 has a length L, a width W, and a thickness T. Exemplary dimensions for the length, width, and thickness may be as follows: L may be less than about 400 mm (e.g., about 288 mm or less), W may be less than about 200 mm (e.g., about 86 mm or less), and T may be less than about 200 mm (e.g., about 86 mm or less). Because the length L is greater than the width W and thickness T, the length L may constitute a major dimension. When the port replicating apparatus 102 is vertically oriented, the major dimension is vertical. When the port replicating apparatus 102 is horizontally oriented, the major dimension L is horizontal.

As shown, the base 104 supports the port replicating apparatus 102 and is horizontally oriented. As shown in FIG. 1(b), the orientation of the base 104 is substantially perpendicular to the orientation of the port replicating apparatus 102.

The base 104 may be separable or integral with the port replicating apparatus 102, and the base 104 may or may not be cooperatively structured with the first terminal end 102(a)-1 of the port replicating apparatus 102. Preferably, the base 104 and the first terminal end 102(a)-1 of the port replicating apparatus 102 have at least one of a male and/or a female connection so that the base 104 and the first terminal end 102(a)-1 of the port replicating apparatus 102 are detachable.

Figures 2A, 2B:
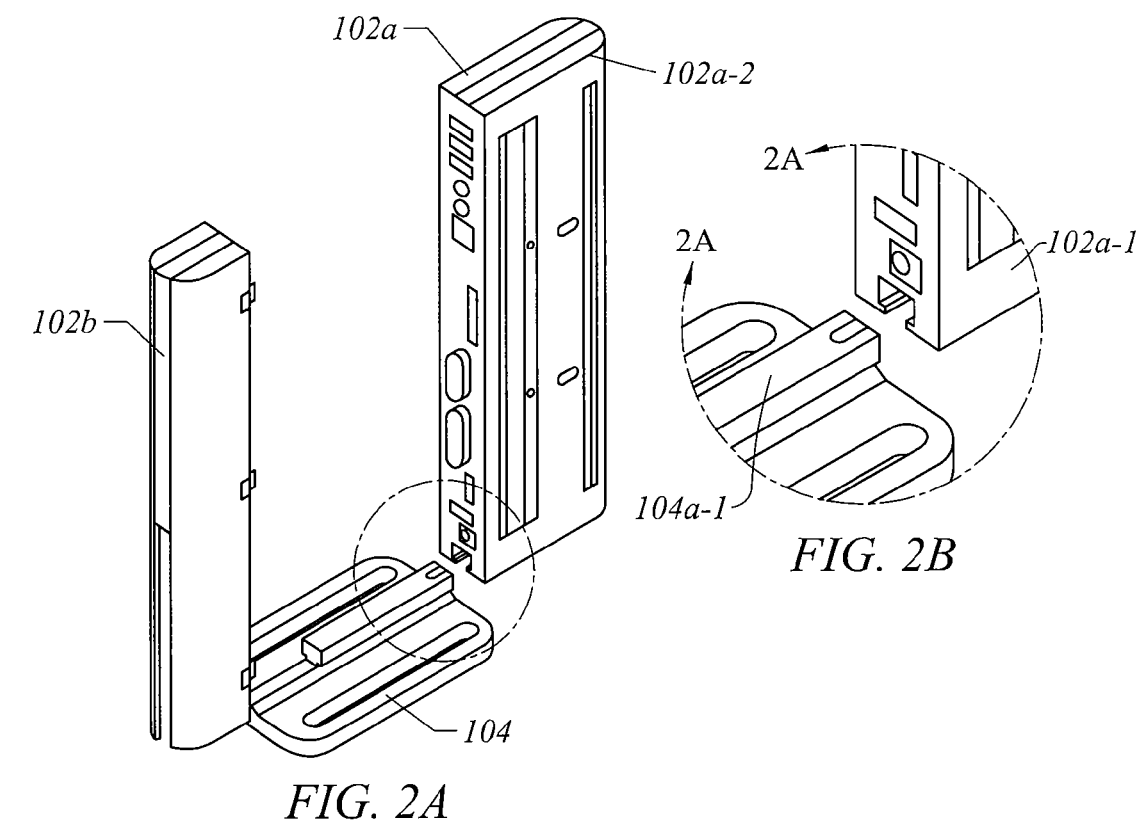
FIG. 2(a) shows a docking assembly with a port replicating apparatus in a vertical position on a base.
FIG. 2(b) shows a port replicating apparatus assembled on a base to form a docking assembly.

FIG. 2(a) shows the parts which may form a port replicating apparatus 102. As shown, the port replicating apparatus 102 may include a main portion 102(a) and an optional rear cover 102(b) which fits over the rear face of the main portion 102(a), and is detachable from the main portion 102(a). As will be described in further detail below, the cover 102(b) can cover wires extending from the rear face of the main portion 102(a) of the port replicating apparatus 102.

As noted above, the cover 102(b) is optional and may form part of the port replicating apparatus 102. Other port replicating apparatus embodiments need not include the cover 102(b), but could simply consist of the main portion 102(a). For example, the main portion 102(a) may be a port replicating apparatus in other embodiments of the invention.

As shown in FIG. 2(a), at least the main portion 102(a) of the port replicating apparatus 102 can mechanically engage the base 104. A preferred engagement mechanism is shown in FIG. 2(b). As shown in FIG. 2(b), the base 104 may have a physical connector such as a rail 104(a)-1, which slidably engages another physical connector such as a cooperatively structured groove at a first terminal end 102(a)-1 of the main portion 102(a) of the port replicating apparatus 102. In this example, the engagement mechanism may be referred to as a sliding dovetail attachment mechanism. Other engagement mechanisms could be used in other embodiments of the invention.

Figure 3:
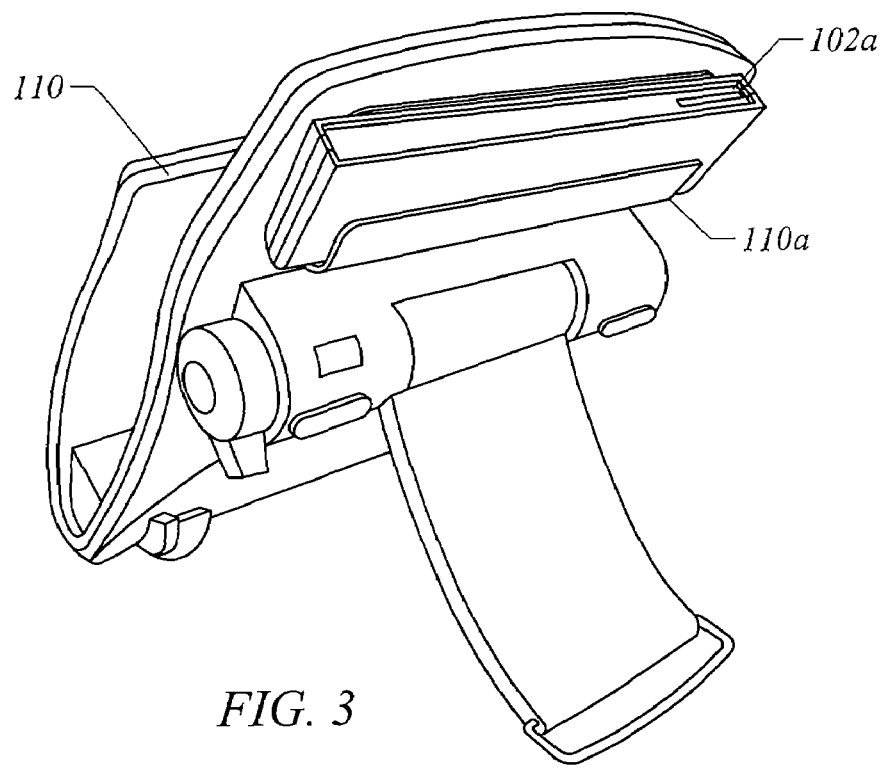
FIG. 3 shows a port replicating apparatus attached to a platform adapted to hold a computer apparatus.

FIG. 3 shows a platform system according to an embodiment of the invention. Other details regarding the platform 110 can be found in U.S. patent application Ser. No. 11/417,947 filed on May 3, 2006, which is herein incorporated by reference in its entirety for all purposes. The platform 110 can support a host portable electronic device such as a laptop computer.

As shown, the platform system includes a platform 110 configured to hold at least the main portion 102(a) of a port replicating apparatus. For this purpose, the platform 110 may include an adjustable stand, and may include a detachable or integral rear well 110(a) for holding at least the main portion 102(a) of the port replicating apparatus 102 in a horizontal position. In this example, the well 110(a) is U-shaped, but it could have other shapes in other embodiments of the invention. The main portion 102(a) is preferably positioned at the rear of the platform 110 so that it is out of the way.

Figure 4A:
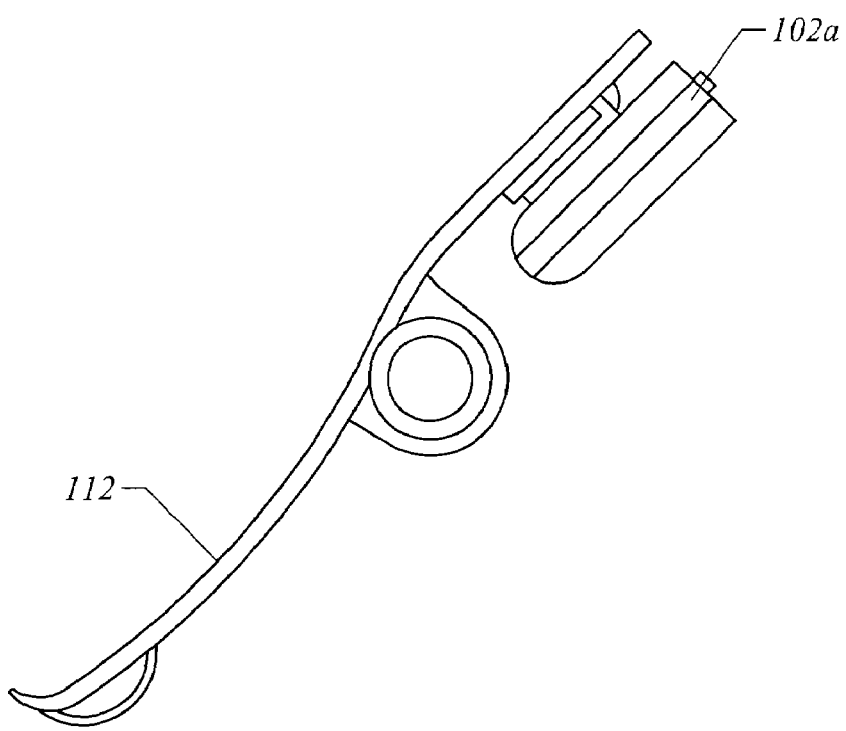
FIG. 4(a) shows a side view of the port replicating apparatus as it is attached to a portion of a platform.

FIG. 4(a) shows a side view of another platform system according to another embodiment of the invention. In this example, only a portion 112 of a platform is shown. In this example, the main portion 102(a) of a port replicating apparatus has a major face, and is attached to the portion 112 of the platform via a mechanical connection at the major face. Thus, in this embodiment, a U-shaped well is not needed to hold the main portion 102(a) behind the platform.

Figure 4B:
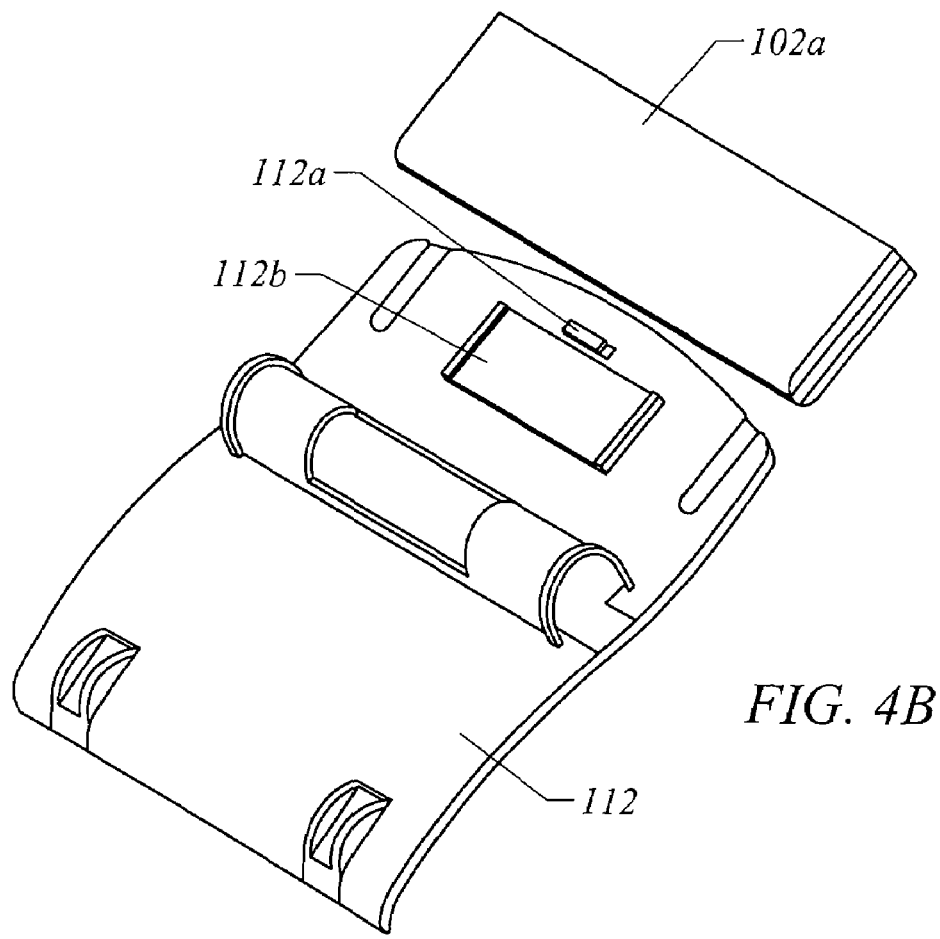
FIG. 4(b) shows bottom perspective view of the port replicating apparatus as it is being attached to a portion of a platform.
Figure 4C:
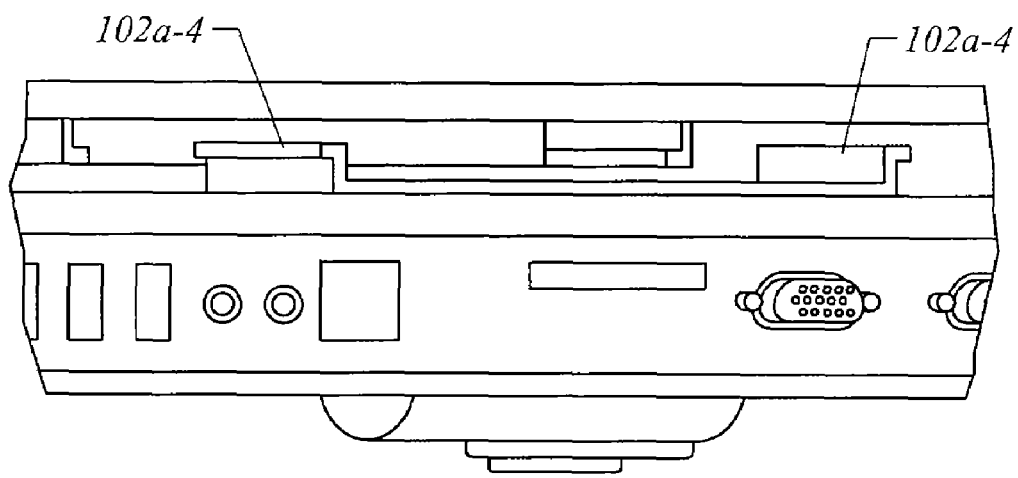
FIG. 4(c) shows a coupling mechanism used to attach a port replicating apparatus with a portion of a platform.

FIG. 4(b) shows a bottom perspective view of the platform system shown in FIG. 4(a). FIG. 4(b) shows part of an engagement mechanism 112(b) including a locking latch 112(a). As shown in FIG. 4(c), the engagement mechanism 112(b) may interface with sliding rails 102(a)-4 at a top or major surface of the main portion 102(a) of the port replicating apparatus 102. The engagement mechanism 112(b) may also include cooperatively structured sliding rails that interface with the sliding rails 102(a)-4 on the main portion 102(a) of the port replicating apparatus 102 so that the main portion 102(a) is secured to the rear of the platform.

Figure 5A:
FIGS. 5(a)-5(d) show perspective views of a main portion of a port replicating apparatus and a removable foot as it is removed from a body and attached thereto.
Figure 5B:
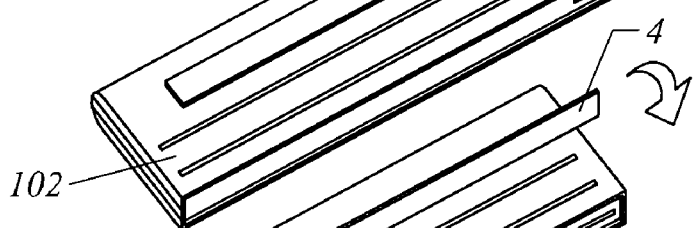
Figure 5C:

FIGS. 5(a)-5(d) show another aspect of the main portion 102(a) of the port replicating apparatus 102(a). As shown in FIG. 5(a), a removable foot 4 may be attached a surface 98 of the main portion 102(a) of the port replicating apparatus 102 and may lie flat against the surface 98 in a first position. In FIG. 5(b), the foot 4 is separated from the surface 98. As shown in FIG. 5(c), the foot 4 is rotated 90 degrees, and is inserted in a slot in the surface 98. The foot 4 is thereafter substantially perpendicular to the surface 98.

Figure 5D:
Figure 6:
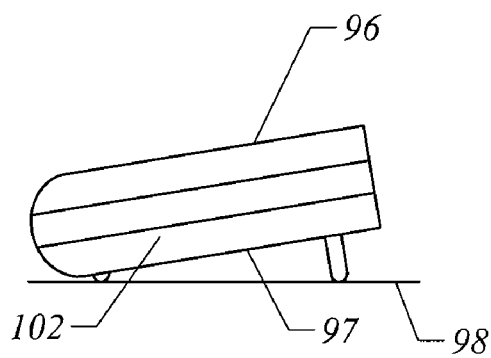
FIG. 6 shows a side view of a main portion of a port replicating apparatus is it is propped up by the removable foot shown in FIGS. 5(a)-5(d).

As shown in FIG. 6, the assembled apparatus shown in FIG. 5(d) may be flipped over and placed on a flat surface 98 such as a desk. The removable foot 4 may prop up a lateral end of the main portion 102(a) such that the upper surface 96 and the lower surface 97 of the main portion 102(a) form angles with the flat surface 98. The angles may be about 10 degrees or less in some embodiments. This advantageously allows a portable laptop computer (not shown) that lies on the upper surface 96 to be flush against it. The laptop computer would be oriented at a slight angle with respect to surface 98.

FIGS. 1-6 show that the port replicating apparatus 102 and/or the main portion 102(a) of the port replicating apparatus 102 may be advantageously positioned in a number of different configurations according to the desire of the end user. As shown in these Figures, the port replicating apparatus 102 (or the main portion 102(a) of the port replicating apparatus 102) may be positioned substantially vertically using a base, or may be positioned horizontally on its own. It may be detachably coupled to a platform, or may be used on a flat surface such as a desk without a platform. When it is in a horizontal position on a flat surface such as a desk, it may also be positioned in an inclined position and may support a host portable electronic device. Thus, embodiments of the invention are more versatile than conventional port replicating apparatuses.

Figure 7A:
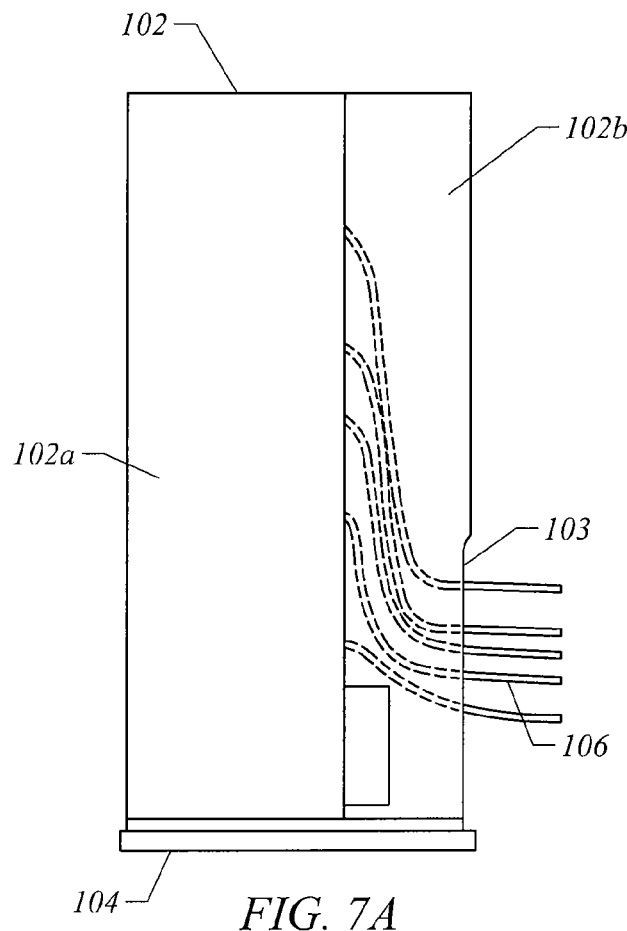
FIG. 7(a) shows a side view of a docking assembly. Wires are shown coming from a back end of the port replicating apparatus.
Figure 7B:
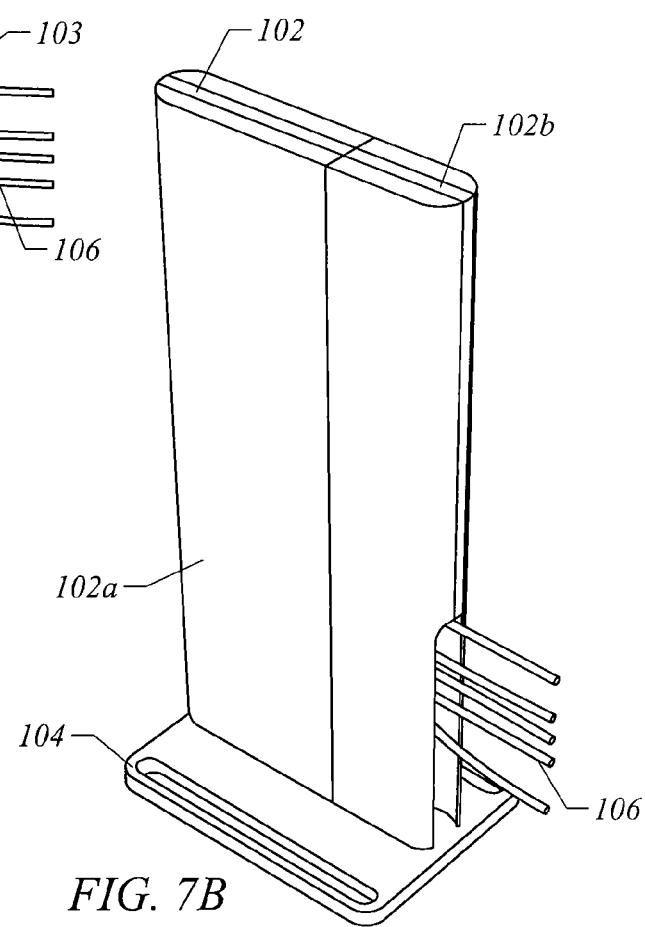
FIG. 7(b) shows a side perspective view of a docking assembly.

FIG. 7(a) shows the port replicating apparatus 102 in a vertically oriented position on the base 104. Wires 106 attached to the electrical connectors (e.g., ports) at a rear face of the main portion 102(a) of the port replicating apparatus 102 extend through an opening 103 in the cover 102(b). As shown in FIG. 7(b), the wires 106 are neatly bundled together as the exit the opening 103. The cover 102(b) organizes the wires 106 and provides the docking assembly with a neat appearance and a favorable wire management system. The cover 102(b) also helps to cover the electrical connectors at the rear of the port replicating apparatus 102(a).

Figure 8:
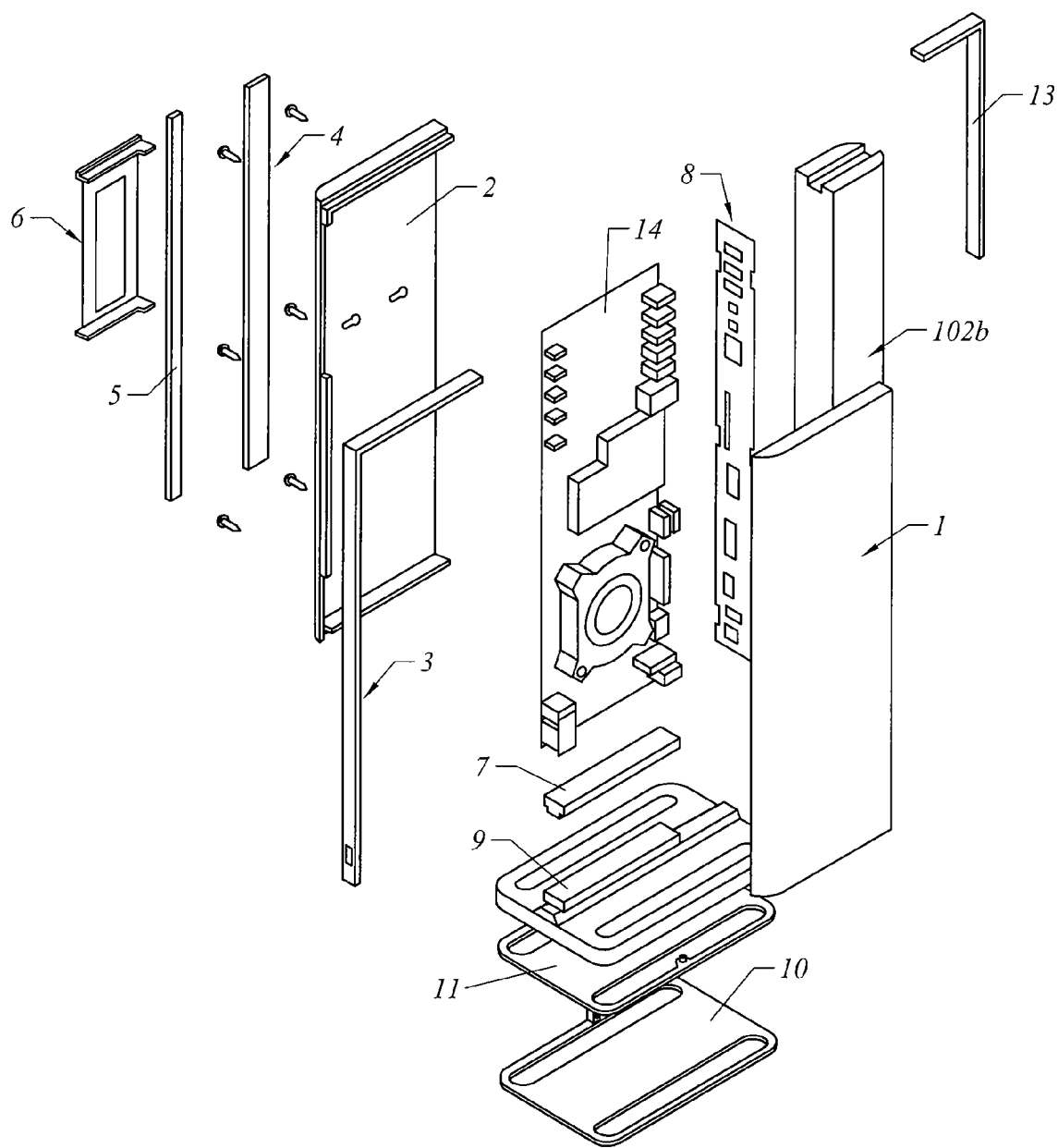
FIG. 8 shows an exploded view of the docking assembly.

FIG. 8 shows an exploded view of some components of the port replicating apparatus. FIG. 8 shows a first housing portion 1 and a second housing portion 2, which may enclose various other components. A front panel 3 may be at a front face of the port replicating apparatus, and the previously described flip foot 4 and another rubber foot 5 may be proximate to the second housing portion 2. A platform adapter 6 may also be proximate to the second housing portion. The platform adapter may be used to attach the port replicating apparatus to a platform and it may include the sliding rails 102(a)-4 shown in FIG. 4(b).

A removable cosmetic plug 7 may be at the first terminal end of the main portion of the port replicating apparatus, and a back plate 8 made of stamped steel or the like may be a rear of the main portion of the port replicating apparatus.

The base may include various components including a base top 9, base rubber 10, and a base ballast 11. These components may be respectively made of ABS plastic, molded rubber, and stamped steel in some embodiments.

The previously described cover 102(b) is also shown in FIG. 8, as well as a back panel 13. A PCB (printed circuit board) assembly 14 with various electrical components would lie between the first and second housing portions 1, 2. The housing may include the first and second housing portions 1, 2, as well as any other structures forming an enclosure.

Figure 9A:
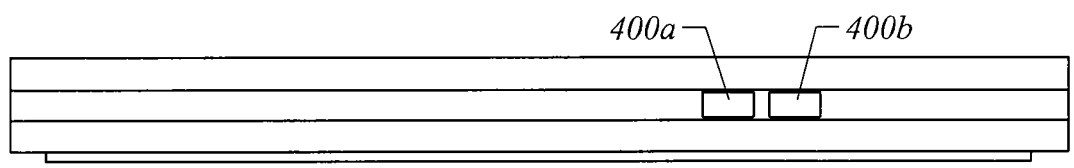
FIGS. 9(a)-9(b) respectively show front and rear views of a main portion of a port replicating apparatus.

FIG. 9(a) shows a front face of the main portion of the port replicating apparatus. As shown, there are two USB (universal serial bus) ports 400(a), 400(b) at the front face of the main portion of the port replicating apparatus. This is just an example of possible configurations.

Figure 9B:
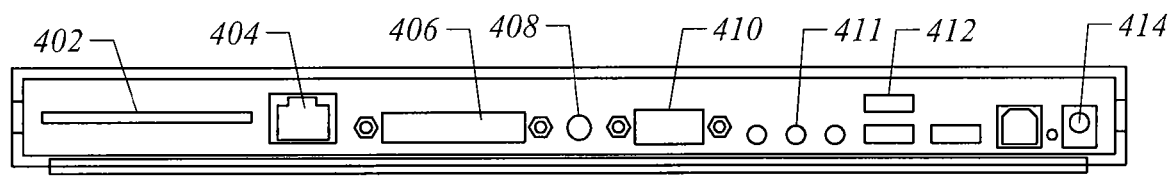

FIG. 9(b) shows a rear face of the main portion of the port replicating apparatus. As shown, a number of input and connectors would be present at a rear face of the main portion of the port replicating apparatus. The input and connectors can include the following ports: PC slot 402, an Ethernet port 404, a printer port 406, a PCI Express cable port 408, an auxiliary input/connector 410, an audio connector (and microphone connector) 411, stacked USB ports 412, and a power port 414. Of course, in other embodiments of the invention, more or less input and/or connectors could be used. As shown, the different ports are examples of different connectors and they may have different physical and/or electrical configurations.

Figure 10A:
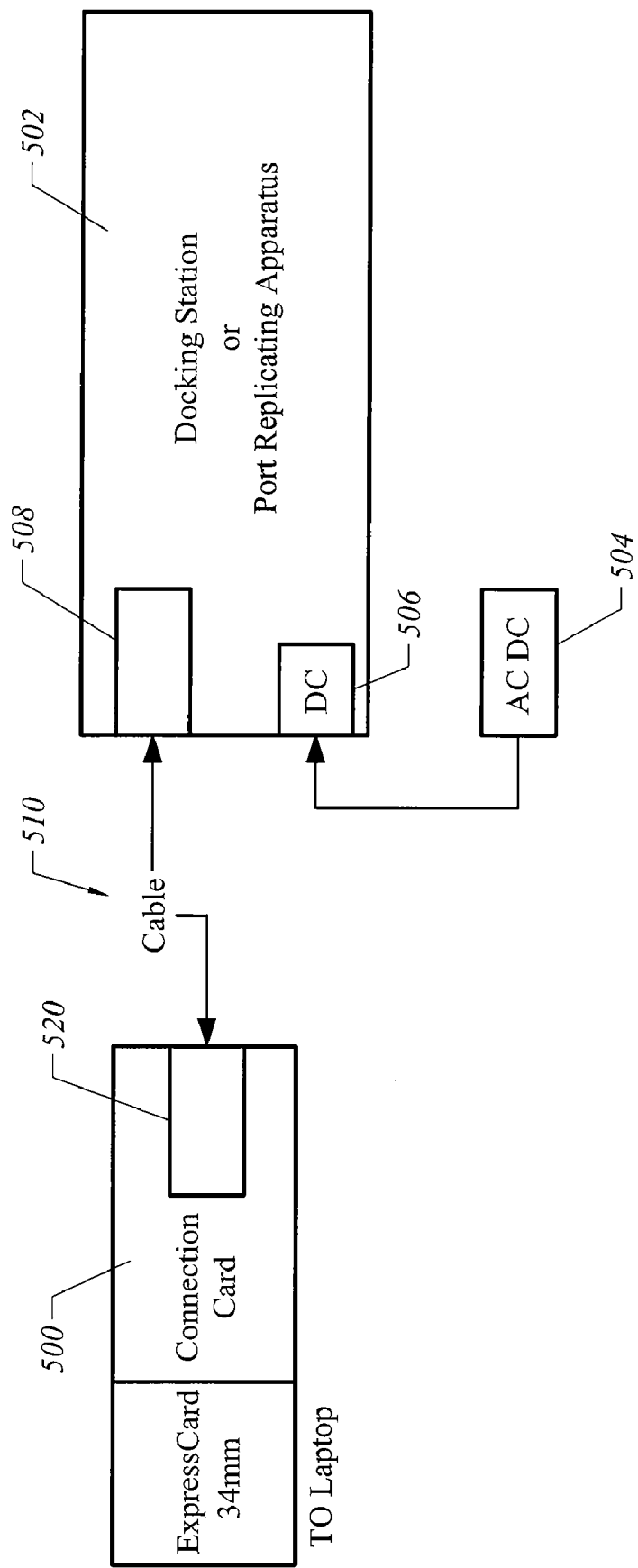
FIG. 10(a) is a high level block diagram showing a system according to an embodiment of the invention.

FIG. 10(a) shows a block diagram of a system according to an embodiment of the invention. The system includes a connection card 500 and a cable port 520 in the connection card 500. The connection card 500 may connect to a connector on a portable electronic device such as a laptop computer. Preferably, the connection card 500 is a PCMCIA ExpressCard. The cable port 520 may be configured to receive one end of a cable 510 or some other type of data transfer cable.

The PCI Express standard provides a scalable, high speed, serial I/O bus that maintains backward compatibility with PCI applications and drivers. A PCI Express architecture has a topology which contains a host bridge and several endpoints (the I/O devices). Compared to the older PCI (peripheral components interface) standard, the PCI Express architecture has multiple point-to-point connections and introduces a new element, the switch, into the I/O system topology. The switch replaces the multi-drop parallel bus PCI technology and is used to provide fan-out for the I/O bus. A switch may provide peer-to-peer communication between different endpoints and this traffic, if it does not involve cache-coherent memory transfers, need not be forwarded to the host bridge. The switch can be a separate logical element, or it could be integrated into a host bridge component. A PCI Express interface or PCI connector may thus be adapted for use with a switching, serial bus architecture. See "Creating a Third Generation I/O Interconnect" by Ajay Bhatt (www.express-lane.org).

PCI Express cards have also been developed and are used in conjunction with PCI Express interfaces. Current PCI standard and low-profile cards are used in a variety of platforms, including servers, workstations, and desktops. PCI Express also defines standard and low-profile cards that can replace or coexist with legacy PCI cards. These cards have the same dimensions as PCI cards and are equipped with a rear bracket to accommodate external cable connections. The differences between the PCI and PCI Express cards lie in their I/O connectors. A x1 PCI Express connector has 36 pins, compared to the 120 pins on a standard PCI connector.

PCI Express cards include ExpressCard modules, which currently have two different module widths: 34 mm and 54 mm. ExpressCard modules can be plugged into an external ExpressCard slot in a portable computer or the like, just as PC Cards are used today.

Referring to FIG. 10(a) again, the other end of the cable 510 may connect to an input port 508 in the port replicating apparatus 502, which may be a docking station or a port replicator. The input port 508 may be an interface that is adapted for use with a switching, serial bus architecture. A power supply 504 connection may be provided through a DC input 506.

Figure 10B:
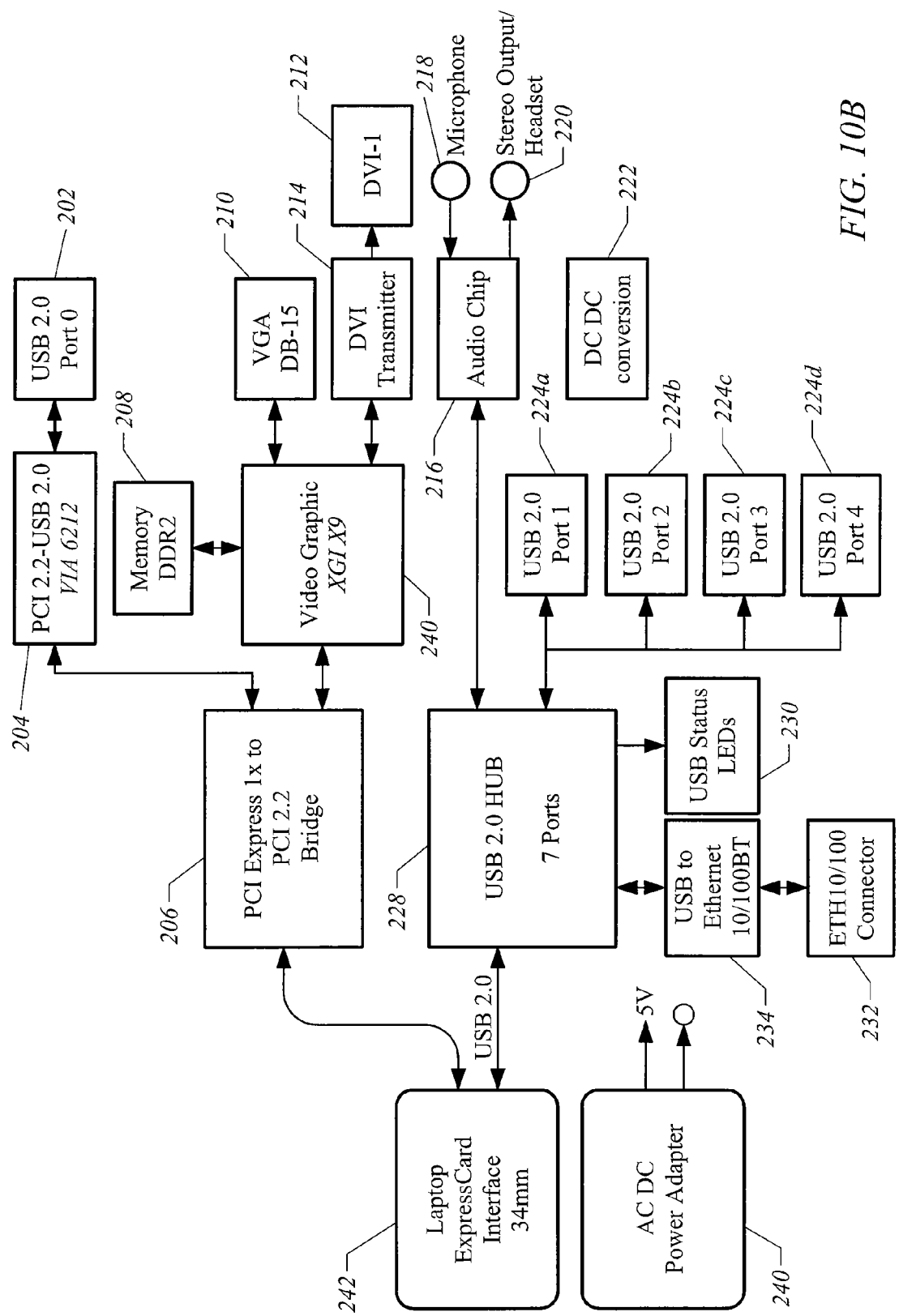
FIG. 10(b) is a block diagram of some components of the port replicating apparatus.

FIG. 10(b) shows a block diagram of some electrical components of the previously described port replicating apparatus. It may include an interface such as a PCMCIA Express-Card interface 242. The interface 242 may correspond to the input port 508 shown in FIG. 10(a). The interface 242 may be embodied by a male or female electrical connector, or even a wireless interface.

The interface 242 is operatively coupled to a USB 2.0 hub 228. A number of elements are coupled to the USB 2.0 hub 228. For example, USB ports 224(a), 224(b), 224(c), 224(d), a USB to Ethernet 10/100BT adapter 234, an audio chip 216, as well as USB status LEDs 230, are operatively coupled by the USB hub 228. An Ethernet 10/100 connector 232 is coupled to the USB to Ethernet 10/100BT adapter 234. A microphone port 218 and a stereo output/headset connector 220 are operatively coupled to the audio chip 216.

As shown in FIG. 10(b), the interface 242 is also operatively coupled to a PCI Express to PCI 2.2 bridge 206. PCI Express 1x to PCI 2.2 bridges are commercially available from Texas Instruments, Inc. A PCI 2.2 to USB 2.0 bridge 204 is operatively coupled to the PCI Express 1x to USB 2.0 bridge 204. An exemplary PCI 2.2 to USB 2.0 bridge is embodied by a VIA 6212 chip, which is commercially available from Via Technologies. A USB 2.0 port 202 is operatively coupled to the PCI 2.2 to USB 2.0 bridge 204.

Any of the USB 2.0 ports 224(a), 224(b), 224(c), 224(d) may be considered a first connection port. The USB 2.0 port 202 may be considered a second connection port. As shown, the USB 2.0 port 202 has a connection path that is separate from the USB 2.0 ports 224(a), 224(b), 224(c), 224(d) coupled to the USB 2.0 hub 228. Because the second USB 2.0 connection port 202 is separated from the hub 228, it can provide for faster data transfer than any of the first USB 2.0 connection ports 224(a), 224(b), 224(c), 224(d). The second USB connection port 202 may therefore be connected to peripheral devices that need faster data transfer. Such peripheral devices include mass storage devices such as external hard disk drives. Peripheral devices that do not need higher data transfer rates may be connected to any of the first USB connection ports 224(a), 224(b), 224(c), 224(d). Such peripheral devices may include mice, keyboards, etc. By providing for separate USB ports with separate connections to the interface 242, the data transfer to the various peripheral devices that are connected to connectors in the port replicating apparatus can be optimized.

FIG. 10(a) also shows a graphics chip 240 (e.g., an XGI X9 graphics chip) that is coupled to the PCI Express 1x to PCI 2.2 Bridge 206. A memory 208, a VGA (video graphics array) port 210, and a DVI transmitter chip 214 and DVI-I port are coupled to the graphics chip 240. (DVI-I stands for Digital Video Interface-Integrated and means that a DVI connector that can transmit both analog and digital video data.) DVI transmitter chips are commercially available from various vendors such as Silicon Image and Texas Instruments. Display devices such as VGA monitors, LCD displays, etc. may be connected to the port replicating apparatus via the VGA port 210 or the DVI-I port 212.

Other components such as an AC/DC power adapter 240 and a DC to DC conversion element 222 are also shown in FIG. 10(a).

Port Replicating Apparatuses Including Display Control Elements

A conventional port replicating apparatus can have a display connected to an output connector and a host computer connected to an input interface. The user can control the display by manipulating the host computer. For example, when using a Windows™ operating system, a user may "right click" a mouse button to display a "properties" tab to display properties. The settings tab may then be selected using a data input device such as a mouse, and the proper display can be selected. The screen resolution can be selected, and the option for extended mode or clone mode can be selected using the mouse. Although this process can be used to control the display, it can be quite cumbersome and is not particularly user friendly.

One embodiment of the invention that can address this problem is directed to a port replicating apparatus including at least one input element that can allow a user to control a display connected to the port replicating apparatus. This and other embodiments of the invention solve the problem of using a host computer to control the display. By inputting display control commands using input elements on a port replicating apparatus, the user can configure display settings in a more user-friendly way.

In preferred embodiments, various input/output (I/O) commands or other control commands can be provided through a set of input elements such as buttons (keys) that are present on the port replicating apparatus. For example, there may be one or more toggle switches, buttons, etc. may be on the port replicating apparatus and may be manipulated to cause a display to be in an extended mode or a clone mode. A "clone mode" is a mode whereby an image on the host computer screen or generated by the host computer is displayed on the display that is connected to the port replicating apparatus. An "extended mode" is a mode whereby an image is divided between a screen (e.g., a laptop computer screen) associated with a host computer and another display connected to the port replicating apparatus. When the display is in the clone mode, the best supported resolution of the display that meets the resolution of the primary display associated with the host computer is selected and the resolution up and resolution down keys may be disabled.

Other input elements may by provided on the port replicating apparatus. Such input elements may include a "resolution up" button (or other type of data input element), where the resolution increases to the next available resolution supported by the attached display (or monitor), as well as a "resolution down" button, which decreases the resolution to the next available resolution supported by the attached display (or monitor). Other input elements may include buttons or the like that can increase or decrease tint, turn on a screen saver, etc. Available resolutions can be provided through EDID (extended display identification data) information by the display. If this information is not available, then standard VESA (Video Electronics Standards Association) settings are considered.

Figure 11:
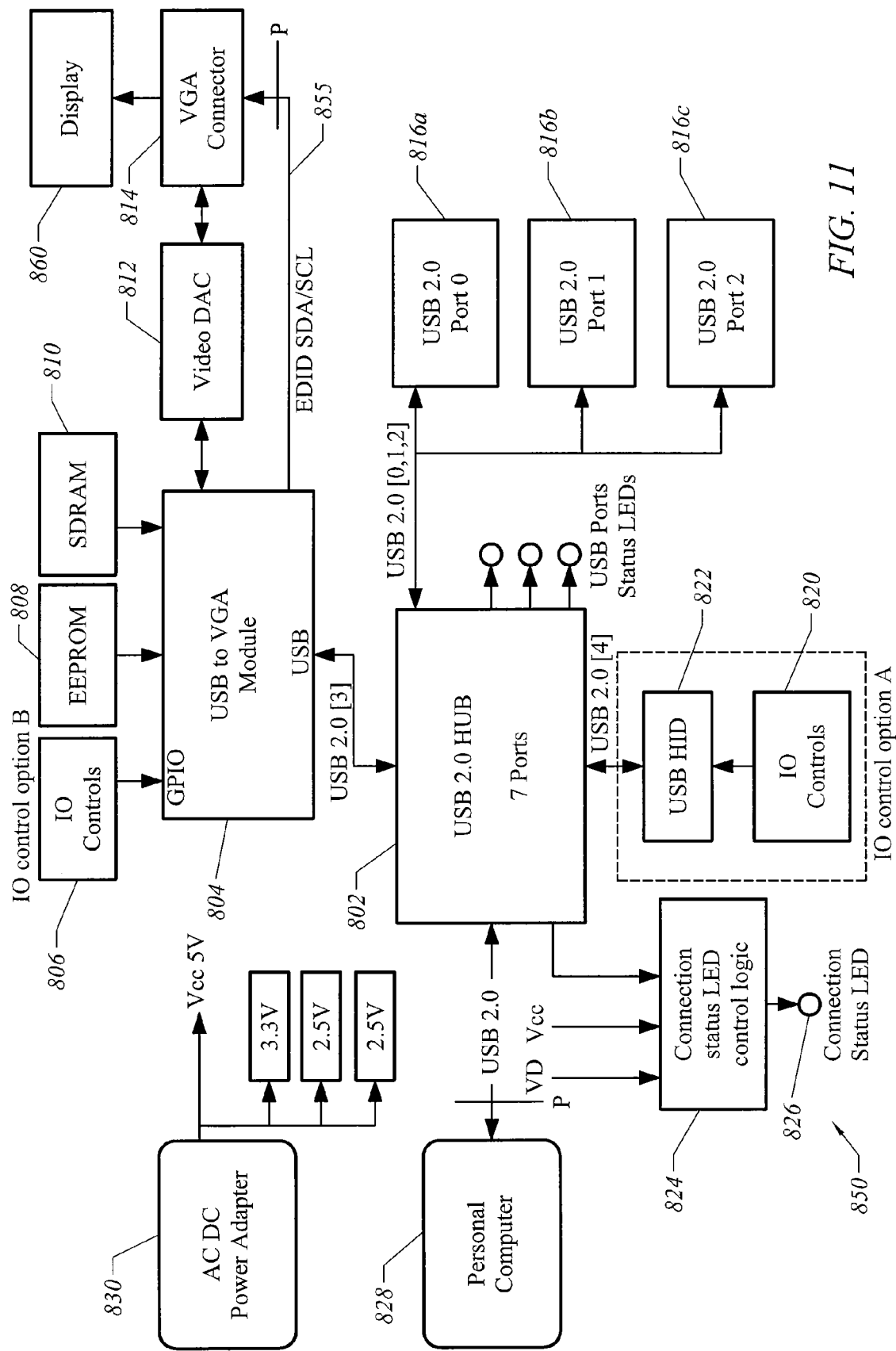
FIG. 11 shows a block diagram of some components of another port replicating apparatus embodiment. The port replicating apparatus embodiment includes at least one input element which allows one to control the operation of a display device.

FIG. 11 shows a block diagram according to an embodiment of the invention. Components of the block diagram shown in FIG. 11 may be combined with components in the block diagram shown in FIGS. 10(a) and/or 10(b), or any of the other port replicating apparatus features above, without departing from the spirit and scope of the invention.

FIG. 11 shows an AC/DC power adapter 830 and a host computer such as a personal computer 828 which may be connectable to input ports in a housing of a port replicating apparatus (examples of which are shown in prior Figures). A display 860 may also be removably coupled to an output port of the port replicating apparatus. The other components in FIG. 11 may be present within or associated with a port replicating apparatus, as shown by the dividing lines P.

The personal computer 828 may be connected to a USB hub 802 in the housing of the port replicating apparatus. The USB hub 802 may be connected to a number of USB ports 816(*a*)-816(*c*) with corresponding USB port status LEDs 834 (or other display elements). When the USB ports 816(*a*)-816 (*c*) are used, the corresponding LEDs 834 light up. The USB hub 802 may also be connected to a USB HID (USB Human Interface Design) module 822, which is operatively connected to other input elements (e.g., input output controls 820).

A connection status and LED control logic circuit 824 and a corresponding connection status LED 826 may also be coupled to the USB hub 802. A USB to VGA module 804 is also operatively coupled to the USB hub 802. The module 804 may be embodied by a commercially available chip, which may include suitable hardware and/or software to convert USB signals into VGA signals. Input elements (e.g., input/output controls 806), an EEPROM 808 and an SDRAM 810 may also be operatively coupled to the USB to VGA module 804. The EEPROM 808, the SDRAM 810, and any other memory elements may be used to store data or configuration parameters that allow the USB to VGA module 804 to convert data transferred through the USB interface to analog VGA electrical signals.

A video DAC (digital to analog controller) 812 and a VGA connector 814 are also coupled to the USB to VGA module 804. The video DAC 812 may convert digital data signals into analog VGA electrical signals. These signals may then be sent to the VGA connector 814, and then to the display 860, which may be removably connected to the VGA connector 814.

An EDID SDA (serial data)/SCL (serial clock) communication line 855 is also shown in FIG. 11 and allows the USB to VGA module 804 to communicate with the external display 860. Control and feedback signals for controlling the display 860 may be sent through the communication line 855.

In FIG. 11, two sets of input elements (e.g., input/output controls 806, 820) are shown. Both sets of input elements could be present in a single port replicating apparatus or only one of the input elements may be present in the single port replicating apparatus. Either or both of the input/output controls 806, 820 may be used to control the operation of the display 860.

To accomplish this, the personal computer 828 that is connected to the USB hub 802 may comprise a software driver program for recognizing input control signals provided by the input/output controls 802 or the input/output controls 820. In this regard, the personal computer 828 or other portable electronic device may comprise a computer readable medium for receiving input signals from the input elements and for causing corresponding control signals to be sent to the display 860 to control the operation of the display 860. The computer readable medium may also comprise code for performing any of the functions described in this application. In addition, although the computer readable medium is this embodiment resides in the personal computer 828, it is understood that a similar computer readable medium may be present in the port replicating apparatus itself. Suitable computer readable media may store data in a volatile or non-volatile manner using any suitable electrical, optical, and/or magnetic data storage mechanism.

Referring to FIG. 11, in one embodiment of the invention, input signals caused by manipulation of the input/output controls 806 may be sent to the USB to VGA module 804, to the USB hub 802, and to the personal computer 828. Once these control signals are received by the personal computer 828, the software driver program may in turn cause the personal computer 828 to send video content to the display 860 via the USB interface, USB hub 802, the USB to VGA module 812, and the VGA connector 814 depending on the control signal received.

In another embodiment, input signals caused by manipulation of the input/output controls 820 may be sent to the USB HID module 822, to the USB Hub 802, and to the personal computer 828. Once the control signals are received, the software driver program may in turn cause the personal computer 828 to send video content to the display 860 via the USB hub 802, the USB to VGA module 812, and the VGA connector 814 depending on the control signal received.

Figure 12A:
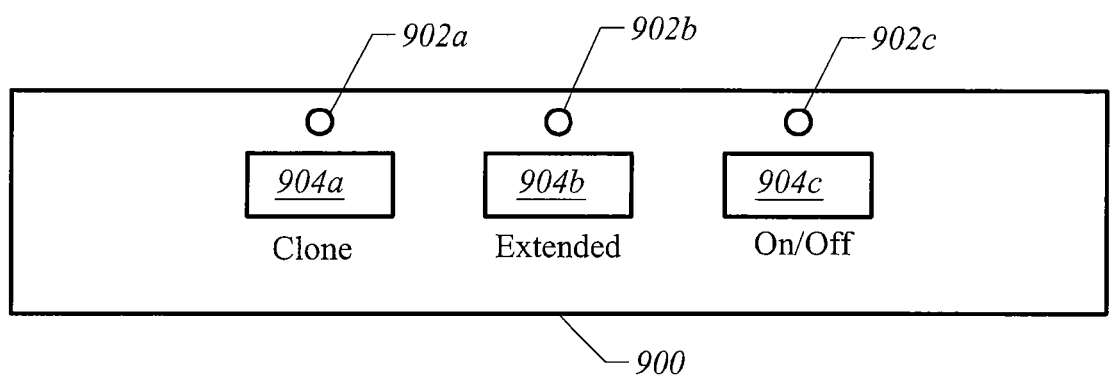
FIG. 12(a) shows a portion of a port replicating apparatus and input elements that allow a user to control the operation of a display device.
Figure 12B:
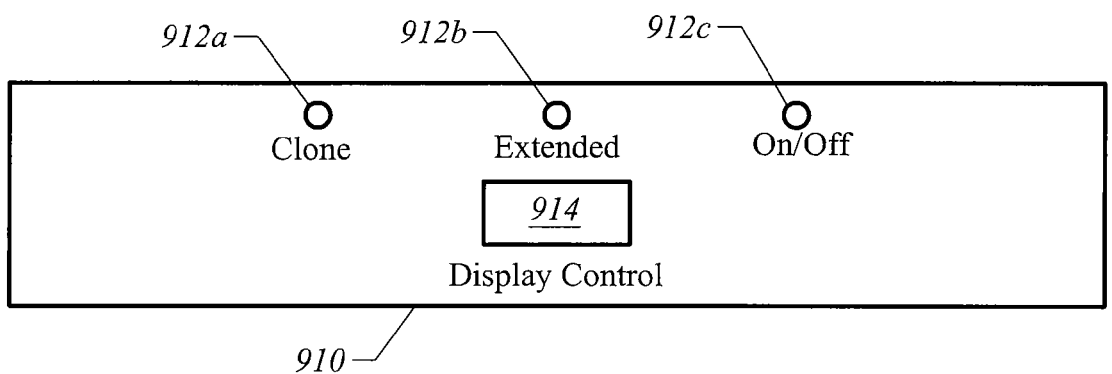
FIG. 12(b) shows a portion of a port replicating apparatus and a single input element that allows a user to put a display device in two or more modes of operation.

FIG. 12(*a*) shows a front view of input elements 904(*a*)-904(*c*) in the form of buttons on a port replicating apparatus 900. LEDs 902(*a*)-902(*c*) are associated with input elements 904(*a*)-904(*c*). Input element 904(*a*) is a button which can be selected to put a display coupled to the port replicating apparatus 900 in a clone mode. Input element 904(*b*) is a button which can be selected to put a display coupled to the port replicating apparatus in an extended mode. Input element 904(*c*) is a button which can be selected to put a display coupled to the port replicating apparatus in an on or off mode. When the appropriate input elements 904(*a*)-904(*c*) are activated, the appropriate LEDs 902(*a*)-902(*c*) may light up to show the user which mode is currently active.

FIG. 12(*b*) shows a front view of a single input element 914 in the form of a button on another port replicating apparatus 900 embodiment. In this example, there are three LEDs 912(*a*)-912(*c*) associated with the single input element 914. The input element 914 may be selected once to put the display in a clone mode, twice to put the display in an extended mode, and three times to turn the display off. Corresponding LEDs 912(*a*)-912(*c*) will light up when the port replicating apparatus 900 is in the correct mode.

As noted above, although input elements for putting a display in a clone mode, extended mode and off state are shown in FIGS. 12(*a*)-12(*b*), other types of input elements may put a display in another mode. For example, other types of input elements may decrease or increase the resolution or brightness of a display, change the tint of the display, cause the display to be in a picture in a picture mode, etc.

Figure 13A:
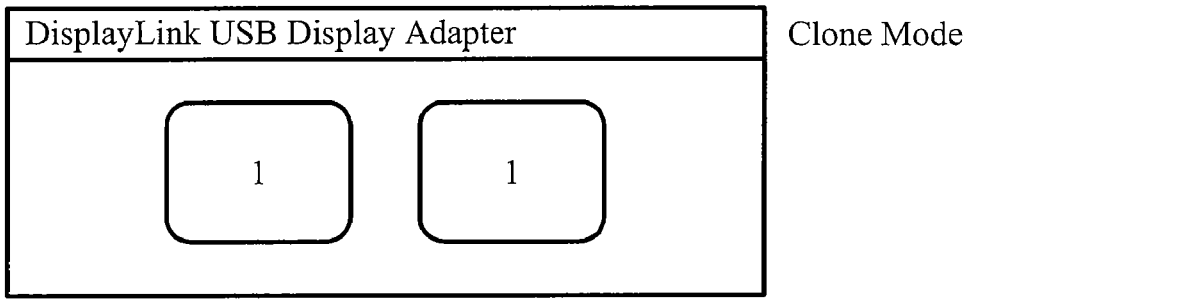
FIGS. 13(a)-13(c) show images that can be displayed on a computer screen showing the operational mode of an external display.
Figure 13B:
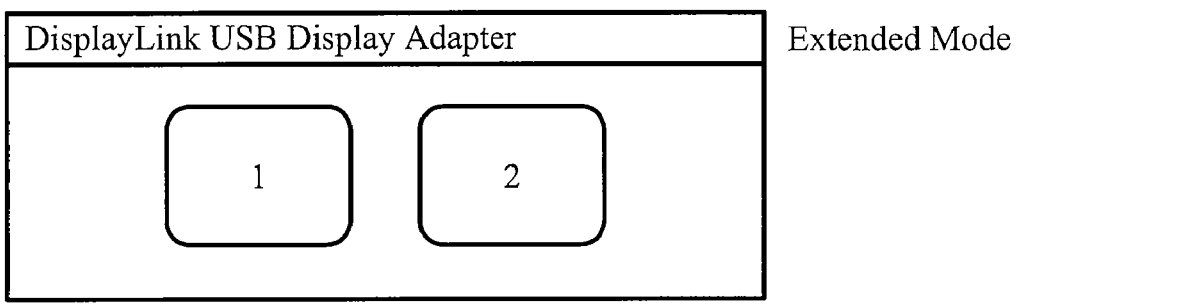
Figure 13C:
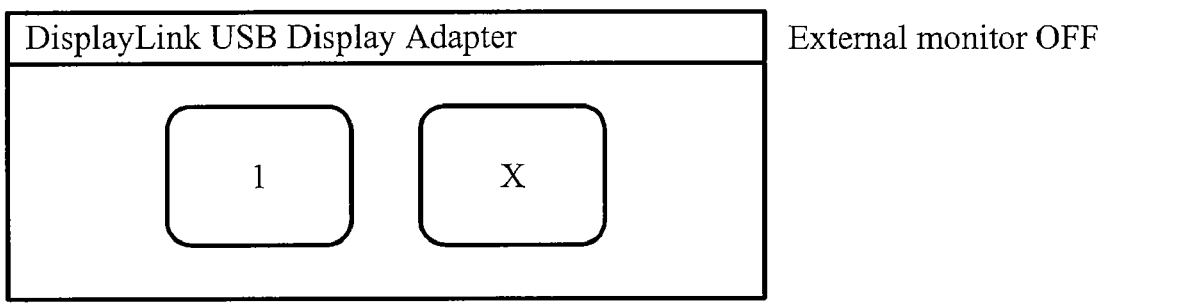

FIGS. 13(*a*)-13(*c*) respectively show display images corresponding to the following display modes: clone; extended; and external monitor off. These images may be displayed on a portable computer display screen to indicate the mode of an external display attached to the port replicating apparatus.

Figure 14:
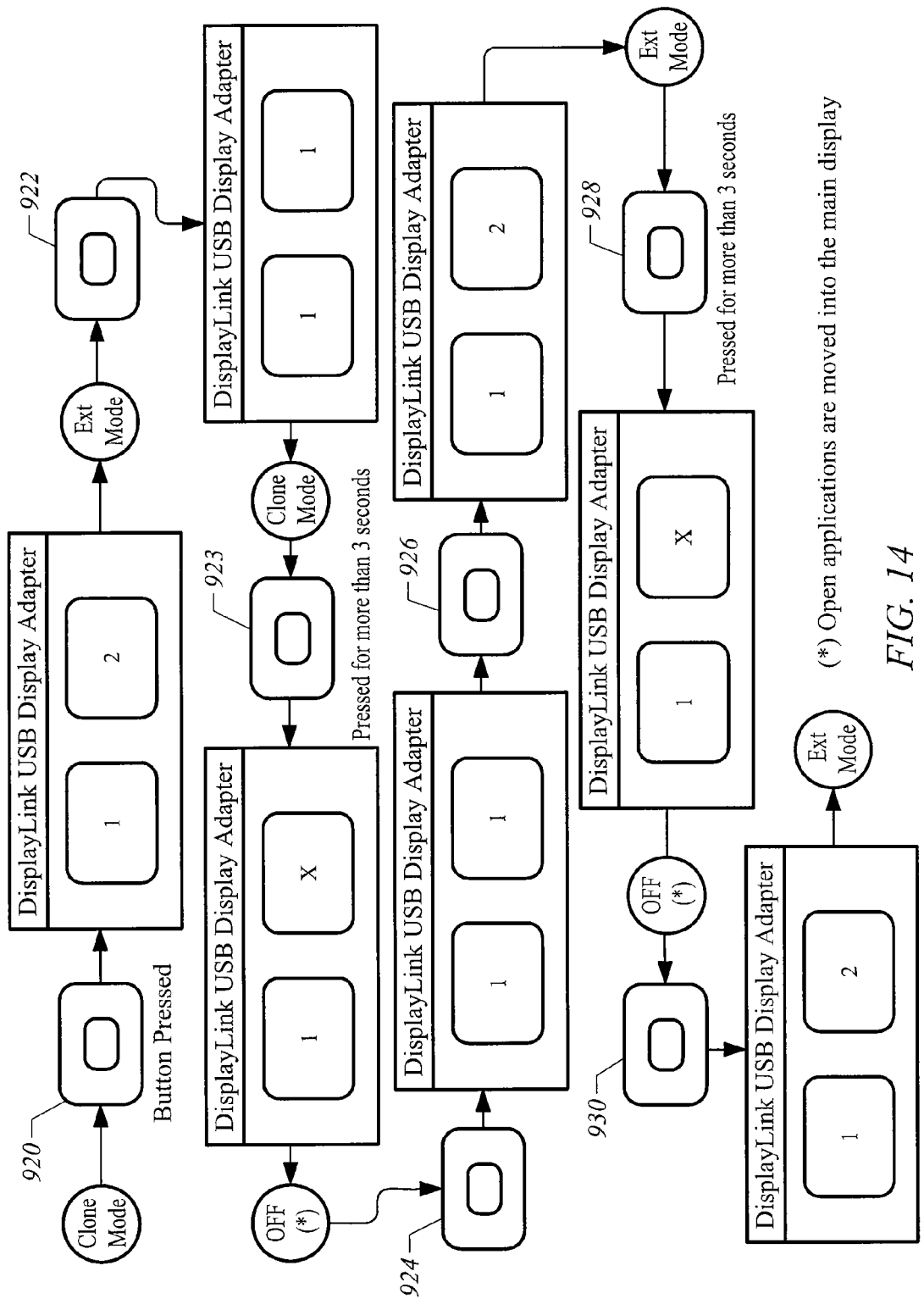
FIG. 14 shows a flow diagram of display screens corresponding to operational modes after a button is pressed.

FIG. 14 shows a flow diagram of display images that can be displayed after a button pressed. At 920, a button is pressed once and the image with "1" and "2" to indicate an extended mode is displayed on the display screen of a main computer attached to a port replicating apparatus. At 922, the button is again pushed and the image with "1" and "1" to indicate a clone mode is displayed on the display screen. At 923, the button is pushed and held for a predetermined amount of time (e.g., 3 seconds) to turn off the external display attached to the port replicating apparatus. This is represented as an image "1" and "X" on the display of the main computer display screen. The extended button hold time is designed so that the user can quickly switch between clone and extended modes by pushing the button briefly. To turn off the external display, the user would need to push and hold the button down for a longer period of time.

At 924, pushing the button again will turn on the external display and will put the external display in a clone mode. At 926, the button is pushed again, and the external display is in an extended mode. The button is pushed yet again for a predetermined amount of time at 928, and the external monitor is turned off. Last, at 980, the button is pushed again and the external monitor is put into an extended mode.

Software for performing the functions shown in FIGS. 13, 14, and in any other portion of this application can be embodied by computer code which is stored in a computer readable medium such as a memory chip. Such software can be created by those of ordinary skill in the art.

Any recitation of "a", "an", and "the" is intended to mean one or more unless specifically indicated to the contrary.

The terms and expressions which have been employed herein are used as terms of description and not of limitation, and there is no intention in the use of such terms and expressions of excluding equivalents of the features shown and described, it being recognized that various modifications are possible within the scope of the invention claimed.

Moreover, one or more features of one or more embodiments of the invention may be combined with one or more features of other embodiments of the invention without departing from the scope of the invention.

What is claimed is:

1. A system comprising:
   a port replicating apparatus comprising
   a housing,
   an interface in the housing for connecting to a portable electronic device, the interface being adapted for use with a switching, serial bus architecture, and
   a plurality of connectors in the housing for connecting to a plurality of peripheral devices, the plurality of connectors including a first universal serial bus connector electrically coupled to the interface via a universal serial bus hub, and a second universal serial bus connector separately coupled to the interface without an intervening universal serial bus hub;
   a portable computer comprising a card slot; and
   a card disposed in the card slot, wherein the card is operatively coupled to the interface in the port replicating apparatus.

2. The system of claim 1 wherein the card is a PCI Express card.

3. The system of claim 2 further comprising a mass storage device connected to the second universal serial bus connector.

4. The system of claim 3 wherein at least one of the connectors is a video connector, and wherein the system includes a video terminal connected to the video connector.

5. The system of claim 3 wherein the port replicating apparatus further comprises a universal serial bus to Ethernet adapter coupled to the interface.

6. The system of claim 1 further comprising a cable connecting the interface in the port replicating apparatus and the card.

7. The system of claim 1 wherein the interface is a wireless interface.

8. The system of claim 2 wherein the PCI Express card has a module width of 34 mm.

9. The system of claim 2 wherein the interface is a PCI Express interface and wherein the port replicating apparatus further includes a PCI Express to PCI bridge.

10. The system of claim 9 further comprising:
    a graphics chip connected to the PCI Express to PCI bridge; and
    a memory in the housing, wherein the memory is coupled to the graphics chip.

11. The system of claim 10 further comprising:
    a DVI transmitter chip coupled to the graphics chip.

* * * * *